(12) United States Patent
Nielsen (10) Patent No.: US 12,171,161 B2
(45) Date of Patent: Dec. 24, 2024

(54) ASSEMBLY FOR A MOWER OF A MOWING OR CHOPPING MACHINE, REPLACEMENT CUTTING TOOL AND MOWER

(71) Applicant: Kverneland Group Kerteminde A/S, Kerteminde (DK)

(72) Inventor: Rasmus Elmelund Nielsen, Gudbjerg (DK)

(73) Assignee: Kverneland Group Kerteminde A/S, Kerteminde (DK)

( * ) Notice: Subject to any disclaimer, the term of this patent is extended or adjusted under 35 U.S.C. 154(b) by 156 days.

(21) Appl. No.: 16/438,698

(22) Filed: Jun. 12, 2019

(65) Prior Publication Data
US 2019/0380268 A1     Dec. 19, 2019

(30) Foreign Application Priority Data
Jun. 13, 2018   (EP) .................................... 18177596

(51) Int. Cl.
*A01D 34/73*   (2006.01)

(52) U.S. Cl.
CPC ......... *A01D 34/733* (2013.01); *A01D 34/736* (2013.01)

(58) Field of Classification Search
CPC .. A01D 34/733; A01D 34/736; A01D 34/535; A01D 1/08; A01D 34/435;
(Continued)

(56) References Cited

U.S. PATENT DOCUMENTS 2,654,986 A * 10/1953 Gold .................... A01D 34/736
                                                                56/295
2,676,861 A *  4/1954 Belew ................. G11B 33/0444
                                                                220/23.6
(Continued)

FOREIGN PATENT DOCUMENTS

DE          2507200 A1 *  8/1975 ............. A01D 35/26
DE     202011050525 U1    11/2011
(Continued)

OTHER PUBLICATIONS

KR 200359485 Y1 translation (Year: 2004).*
European Search Report dated Nov. 30, 2018, pertaining to EP18177596.

*Primary Examiner* — Thomas B Will
*Assistant Examiner* — Madeline I Runco
(74) *Attorney, Agent, or Firm* — Leason Ellis LLP (57) ABSTRACT

The disclosure relates to an assembly for a mower of a mowing or chopping machine, which comprises a tool carrier, which is formed with a carrier disk and which is configured to be mounted rotatably about an axis of rotation to a mower of a mowing or chopping machine; and cutting tools, which are each formed with a cutting blade located radially outwardly to the axis of rotation and a holding section located radially inwardly to the axis of rotation and which are detachably mounted to the carrier disk in an assigned carrier section, wherein the cutting tools are each mounted to the tool carrier by a mounting bolt, wherein the mounting bolt is in each case mounted to the cutting tools in a non-detachable manner. The disclosure furthermore relates to a replacement cutting tool and a mower for a mowing or chopping machine.

11 Claims, 11 Drawing Sheets

(58) Field of Classification Search
CPC ... A01D 34/73–76; F16B 19/02; F16B 19/04; F16B 19/06; F16B 3/00
See application file for complete search history.

(56) References Cited

U.S. PATENT DOCUMENTS

| | | | |
|---|---|---|---|
| 3,320,732 A | 5/1967 | Kirk | |
| 3,690,051 A * | 9/1972 | Wood | A01D 34/736 56/295 |
| 3,762,138 A * | 10/1973 | Michael | A01D 34/733 56/295 |
| 4,313,297 A * | 2/1982 | Maier | A01D 34/733 56/295 |
| 4,996,828 A * | 3/1991 | Jetzinger | A01D 34/733 56/12.7 |
| 5,175,985 A * | 1/1993 | Jetzinger | A01D 34/733 56/1 |
| 5,271,212 A * | 12/1993 | Anderson | A01D 34/736 56/12.7 |
| 6,357,215 B1 * | 3/2002 | Thorne | A01D 34/736 56/295 |
| 6,829,878 B1 * | 12/2004 | Hoffman | A01D 34/736 56/295 |
| 7,647,758 B1 * | 1/2010 | Bandi | A01D 34/733 56/295 |
| 8,510,959 B2 * | 8/2013 | Whitenight | A01D 34/736 30/276 |
| 8,549,724 B2 * | 10/2013 | Davies | F16B 19/1081 411/21 |
| 8,893,461 B2 * | 11/2014 | Nikkel | A01D 45/10 56/295 |
| 9,315,092 B2 * | 4/2016 | Zehnder | F16C 11/04 |
| 2006/0018709 A1 * | 1/2006 | Doerr | F16B 5/065 403/408.1 |
| 2010/0043378 A1 * | 2/2010 | Abernethy | A01D 34/733 56/295 |
| 2013/0247530 A1 * | 9/2013 | Heinrich | A01D 34/733 56/295 |
| 2015/0237798 A1 * | 8/2015 | Lebeau | A01D 34/736 56/255 |
| 2016/0360695 A1 * | 12/2016 | Klackensjo | A01D 34/736 |
| 2018/0103583 A1 * | 4/2018 | Stridh | A01D 34/733 |
| 2019/0274245 A1 * | 9/2019 | Fuse | A01D 34/733 |

FOREIGN PATENT DOCUMENTS

| | | | | |
|---|---|---|---|---|
| DE | 202018004027 U1 * | 11/2018 | | A01D 34/736 |
| EP | 0486459 A1 | 5/1992 | | |
| EP | 1891851 A1 * | 2/2008 | | A01D 34/736 |
| EP | 1588599 B1 | 6/2009 | | |
| EP | 2497353 A1 * | 9/2012 | | A01D 34/733 |
| EP | 2522209 A1 * | 11/2012 | | A01D 34/733 |
| EP | 2818033 A1 * | 12/2014 | | A01D 34/733 |
| FR | 2201821 A1 * | 5/1974 | | A01D 34/733 |
| FR | 2499448 A1 | 8/1982 | | |
| GB | 1460224 A * | 12/1976 | | A01D 34/668 |
| KR | 200359485 Y1 * | 8/2004 | | |
| KR | 20180117406 A * | 10/2018 | | |
| WO | WO-0032025 A1 * | 6/2000 | | A01D 34/736 |
| WO | WO-2006080711 A1 * | 8/2006 | | A01D 34/733 |

* cited by examiner

Fig. 11

ASSEMBLY FOR A MOWER OF A MOWING OR CHOPPING MACHINE, REPLACEMENT CUTTING TOOL AND MOWER

The invention relates to an assembly for a mower of a mowing or chopping machine, a replacement cutting tool, and a mower.

BACKGROUND

Mowing or chopping machines are used in agricultural or horticultural operation, in order to mow and/or to chop soil-grown plants. Such plants include in particular grass. For mowing or chopping, machines are equipped with a mower, which combines the components necessary for mowing/chopping the plants. In the mower, the cutting tools used to cut the plants are arranged on a tool carrier, which during operation usually performs a rotational movement. Such a tool carrier is known from the document EP 0 486 459 B1. The tool carrier described therein provides for mounting the cutting tools, in that a mounting bolt accommodated on the cutting tool is inserted into an elongated hole formed on the tool carrier. For fastening purposes, the bolt is then shifted, relative to the axis of rotation of the tool carrier from a position proximal to the axis of rotation, radially outwardly into a position distal to the axis of rotation in such a way that narrowing sections formed in the distal end region of the elongated hole engage with an assigned constriction on the mounting bolt, so that the cutting tool is secured to the tool carrier.

The document EP 1 588 599 B1 discloses a further mower. There, the mounting bolt accommodated on the cutting tool is fastened to the top side of the tool carrier with the help of a securing component having an elongated hole, which is narrowed on one side. During operation, the cutting tool can pivot about an axis of rotation formed with the help of the mounting bolt, in particular when the cutting tool strikes an obstacle. A stop, which delimits this pivot movement about the mounting bolt of the cutting tool, is formed radially inwardly to the mounting bolt.

An assembly for a mower in a mowing or chopping machine comprising a tool carrier is described in document EP 2 522 209 B1, which tool carrier is formed with a carrier disk and which is configured to be mounted to a mower of a mowing or chopping machine so as to be capable of rotating about an axis of rotation. The assembly has cutting tools, which are each formed with a cutting blade located radially outwardly with respect to the axis of rotation and a holding section located radially inwardly with respect to the axis of rotation, and which are detachably mounted to the carrier disk in an assigned carrier section, wherein, in the assigned carrier sections, an elongated hole is formed, which runs radially to the axis of rotation and into which a mounting bolt, which is used for mounting the cutting tool to the tool carrier, can be inserted in an end region proximal to the axis of rotation, and the elongated hole has, at least in an end region distal to the axis of rotation, engagement sections, which are formed along an elongated hole edge and which engage with a constriction on the mounting bolt when the mounting bolt, which is accommodated in the holding section of the cutting tool, is displaced from the proximal end region of the elongated hole into the region of the elongated hole comprising the engagement sections during the mounting of the cutting tools. Projections located opposite one another and extending in the longitudinal direction of the elongated hole are formed in the assigned carrier sections, which projections delimit or essentially completely prevent a rotation of the cutting tool about the mounting bolt at least when the mounting bolt accommodated in the holding section of the cutting tool is arranged in a radially inner elongated hole half.

SUMMARY

It is the object of the invention to specify an assembly for a mower of a mowing or chopping machine, a replacement cutting tool, and a mower, by means of which operational safety is improved, in particular with regard to an unintentional detaching of a cutting tool from the tool carrier during operation.

According to one aspect, an assembly for a mower of a mowing or chopping machine comprising a tool carrier is created, which is formed with a carrier disk and which is configured to be mounted rotatably about an axis of rotation to a mower of a mowing or chopping machine. The assembly has cutting tools, which are each formed with a cutting blade located radially outwardly with respect to the axis of rotation and a holding section located radially inwardly with respect to the axis of rotation and which are detachably mounted to the carrier disk in an assigned carrier section, wherein the cutting tools are each mounted to the tool carrier by means of a mounting bolt. The mounting bolt is in each case mounted to the cutting tools in a non-detachable manner.

The non-detachable mounting or arranging of the mounting bolt effects a non-separable (destruction-free) fastening with cutting tool, for example a cutting blade, and mounting bolt mounted thereto. The mounting bolt cannot be separated from the cutting tool, without at least partially destroying the mounting bolt and/or the cutting tool. It is thus prevented that one of the two components is replaced in the case of material wear of cutting tool and/or mounting bolt, in order to then continue to use the replaced component with the old and thus also already at least partially worn other component. There would then be the risk of an operation of the mower, which is no longer safe.

In an unmounted position of the cutting tool in an assigned opening of the cutting tool, the mounting bolt may be arranged so as to be capable of being displaced relative to said cutting tool. A loose or movable mounting of the mounting bolt can thereby be formed in the opening (bolt mounting opening). The opening can be an elongated or round hole.

In the unmounted position of the cutting tool, the mounting bolt can be arranged in the assigned opening of the cutting tool so as to be capable of being tilted relative to the cutting tool surface. The mounting bolt can thereby be capable of being tilted for example relative to its longitudinal axis.

Opposite top ends of the mounting bolt, between which a constriction is arranged, can each have a top surface, which is larger than an opening surface of the opening, in which the mounting bolt is arranged.

The mounting bolt can be of multi-part design. The several bolt pieces can be joined to each other so to fasten the mounting bolt to the respective cutting tool in a non-detachable manner.

With respect to the mounting bolt, sleeve components can be connected to one another in a non-detachable manner by means of a core pin or bolt. The sleeve components can be arranged so as to be located opposite one another in the region of the constriction of the mounting bolt. The top ends can be formed in the region of end sections, which are formed distally on the sleeve components with respect to the opening of the cutting tool.

The mounting bolt can be mounted to the cutting tool in a non-detachable manner by means of a connection selected from the following group: rivet connection, weld connection, adhesive connection, thermoforming connection, cold-forming connection and solder connection.

In the assigned carrier sections, an elongated hole can be formed, which runs radially to the axis of rotation and into which a mounting bolt, which is used to mount the cutting tool to the tool carrier, can be inserted in a region proximal to the axis of rotation, wherein the elongated hole can have, at least in a region distal to the axis of rotation, engagement sections, which are formed along an elongated hole edge and which engage with the constriction on the mounting bolt when the mounting bolt, which is accommodated in the holding section of the cutting tool, is displaced from the proximal region of the elongated hole into the region of the elongated hole with the engagement sections during the mounting of the cutting tools.

It can be provided that projections located opposite one another and extending in the longitudinal direction of the elongated hole are formed in the assigned carrier sections, which projections delimit or essentially completely prevent a rotation of the cutting tool about the mounting bolt at least when the mounting bolt accommodated in the holding section of the cutting tool is arranged in a radially inner elongated hole half. The projections extending in the longitudinal direction of the elongated hole secure the cutting tool against an unintentional ejection, thus a detaching from the tool carrier, in particular when, during operation, the cutting tool strikes an obstacle, which causes a shifting, which is directed radially inwardly, of the cutting tool along the elongated hole. This displacement of the cutting tool, which is unintentional during operation, radially inwardly, thus towards the axis of rotation of the tool carrier, has the result that the holding section of the cutting tool is displaced in the region of the projections or moves farther into the region thereof, whereby the lateral projections can expand their guide and/or stop function or can form it in the first place. The cutting tool is additionally secured against an unintentional ejection in this way, in particular when the cutting tool strikes an obstacle hard during operation.

During the mounting and removal of the cutting tool, the projections furthermore take over a guide function, in that, during the shifting of the mounting bolt in the elongated hole, at least the holding section of the cutting tool is guided therebetween during the mounting/removal.

The projections are preferably formed in a region which adjoins radially inwardly to the elongated hole section which is proximal to the axis of rotation. However, a partial or complete overlapping with at least a part of the elongated hole can also be provided.

The cutting tool can be accommodated and secured in the assigned tool carrier section without constraining means, thus in particular without a screw connection. If the cutting tool can only be displaced by means of a radial shifting on the tool carrier, for example between a mounted position, in which the cutting tool is secured to the tool carrier, and a removal position, in which the cutting tool can be removed from the tool carrier, without requiring the release of a special fastening, this fastening type can also be referred to as quick-release closure.

The elongated hole can be formed on a tool carrier underside, for example a flat steel component. In one embodiment, it can be provided that the elongated hole is formed with the help of a functional component applied to the underside of the carrier disk. A projecting bolt head of the mounting bolt can then be guided in a space between carrier disk and functional element. In the case of this or other embodiments, it can be provided that the elongated hole is open in the region of an end, which is proximal to the axis of rotation. The mounting bolt, for example, can then be inserted into the elongated hole through the open end. The engagement sections of the elongated hole can then extend across the entire length of the elongated hole, as necessary. The projections are preferably also arranged on the tool underside.

It can be provided that, on a tool carrier top side, a further elongated hole is formed, which overlaps with the elongated hole at least in sections and leadingly accommodates a bolt end of the mounting bolt, in particular in a laterally guiding manner. The elongated hole can be formed in the carrier disk. The bolt end of the mounting bolt can be accommodated completely or partially in the elongated hole. The guidance of the bolt end in the further elongated hole preferably takes place along an outer circumference of the bolt. In one embodiment, the further elongated hole as an essentially constant hole width across its length.

One embodiment can provide that ends of the projections distal to the axis of rotation form a rotation-inhibiting mechanism with assigned corner regions, which are proximal to the axis of rotation, in the holding section of the cutting tool for the cutting tool, securing the cutting tool in mowing or chopping operation in a use position with regard to the rotation of the cutting tool about the mounting bolt, which rotation-inhibiting mechanism releases a rotation of the cutting tool from the use position, when exceeding a threshold force acting on the cutting tool in the mowing or chopping operation. During normal operation, the rotation-inhibiting mechanism secures the cutting tool against a rotation from the use position, in that the proximal corner region on the holding section of the cutting tool and the distal end of the projections support one another on one or both sides, wherein a limited pivot movement can be provided, as necessary.

When the cutting tool now strikes an obstacle in the mowing or chopping operation, a force acts on the cutting tool, which is greater than the resistance when cutting the plants, so that the rotation-inhibiting mechanism is overcome, whereby a rotation of the cutting tool is released out of the use position. Damages to the cutting tool when slightly striking obstacles are thereby prevented. The cutting tool can evade such light obstacles by overcoming the rotation-inhibiting mechanism. If a harder striking of an obstacle occurs during operation, a displacement of the cutting tool radially inwardly towards the axis of rotation is often triggered additionally. The projections extending in the longitudinal direction of the elongated hole then act as safety for the cutting tool in this case.

The projections can be formed by means of a U-shaped attachment element arranged on the tool carrier underside. The attachment element can be produced, for example, by means of a U-shaped pipe section. The attachment element is preferably mounted on the underside of the carrier disk, preferably by means of welding.

It can be provided that the projections are formed so as to slope obliquely towards the axis of rotation in an end region proximal to the axis of rotation. Alternatively or additionally, the projections can be formed so as to slope radially outwardly.

At least three carrier sections can be formed circumferentially and spaced apart essentially equally on the tool carrier disk. Three tool carrier sections for example comprising a respective cutting tool can be provided, which are arranged circumferentially at a distance of approximately 120°.

The cutting tools can be capable of being mounted to and removed from the tool carrier in a mounting tool-free manner. Such a mounting tool-free handling for mounting and removing the cutting tool is at hand, for example, when the cutting tool with the mounting bolt accommodated thereon has to only be displayed radially outwardly away from the axis of rotation (mounting) and radially inwardly towards the axis of rotation (removal), in order to attach the cutting tool to the tool carrier or to detach it therefrom. The engagement sections engaging with the constriction of the mounting bolt secure the cutting tool against an unintentional detaching in the position located radially outwardly to the axis of rotation.

The cutting tools can be mounted to the tool carrier in a self-aligning manner in the mowing or cutting operation. Due to a rotatability of the cutting tool about the mounting bolt, the cutting tool aligns essentially in the longitudinal direction of the elongated hole when the carrier disk rotates about the axis of rotation. The alignment of the cutting tool is moreover preferably supported on the basis of the interaction with the projections.

It can be provided that the cutting tools can be mounted to the tool carrier in a self-securing manner in the use position in the mowing or cutting operation. A self-securing is in particular provided in that the mounting bolt, together with the cutting tool, is always pushed radially outwardly during operation due to the rotation of the carrier disk.

DESCRIPTION OF EXEMPLARY EMBODIMENTS

Further exemplary embodiments will be described in more detail below with reference to figures of a drawing, in which.

Figure 1:
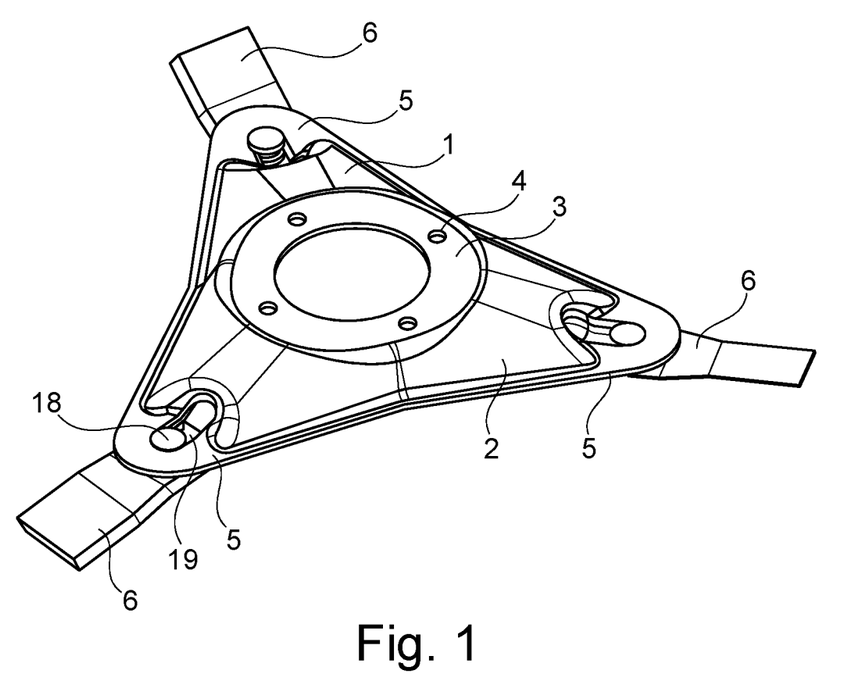
FIG. 1 shows a schematic illustration of an assembly for a mowing or chopping machine obliquely from above.

FIG. 1 shows a schematic illustration of an assembly for a mowing or chopping machine comprising a tool carrier 1, which is formed with a carrier disk 2. The carrier disk 2 has a mounting section 3, which defines an axis of rotation, comprising bores 4, which serve to accommodate screws or bolts during the mounting of the tool carrier 1 in a mower.

Three carrier sections 5 are formed on the carrier disk 2 circumferentially at a distance of approximately 120°, in which a cutting tool 6 is mounted in each case.

Figure 2:
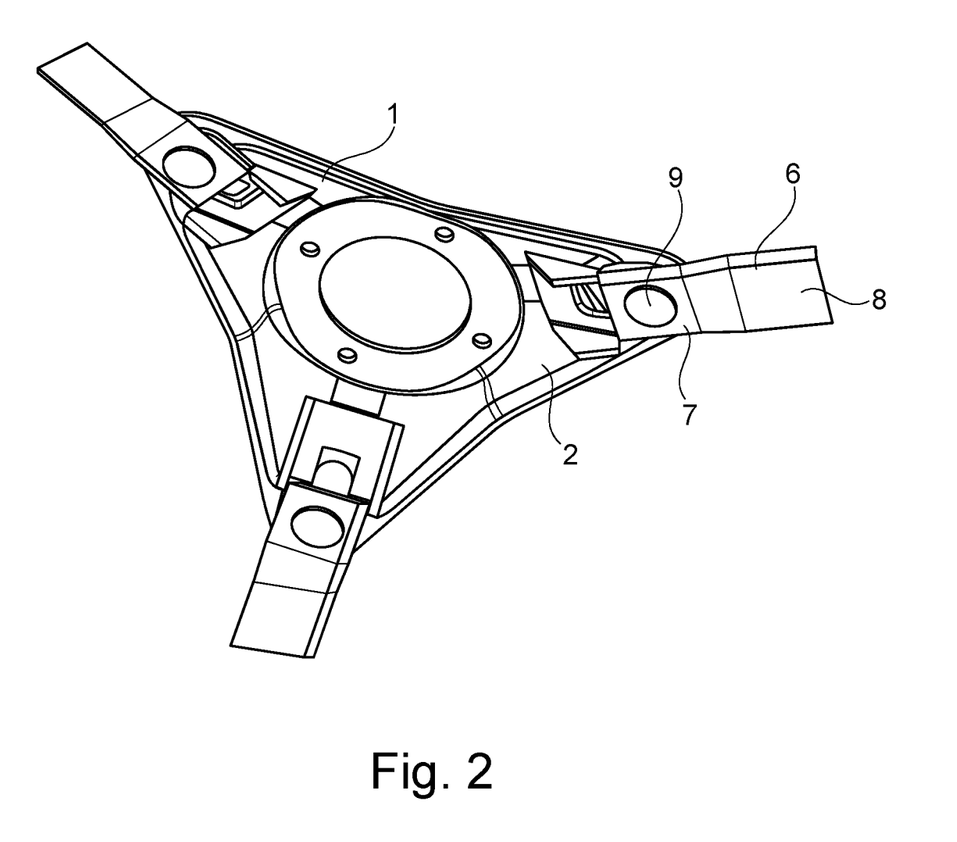
FIG. 2 shows a schematic illustration of the assembly from FIG. 1 obliquely from below.

FIG. 2 shows a schematic illustration of the assembly from FIG. 1 obliquely from below. The cutting tools 6 each have a holding section 7, on which a cutting blade 8 is formed, which is located radially outwardly with respect to the axis of rotation. The cutting tools 6 are mounted in the assigned carrier section 5 with the help of a mounting bolt 9, which forms a local axis of rotation for the cutting tool 6. In mowing or chopping operation, the cutting tools align automatically in the manner illustrated in FIG. 2.

Figure 3:
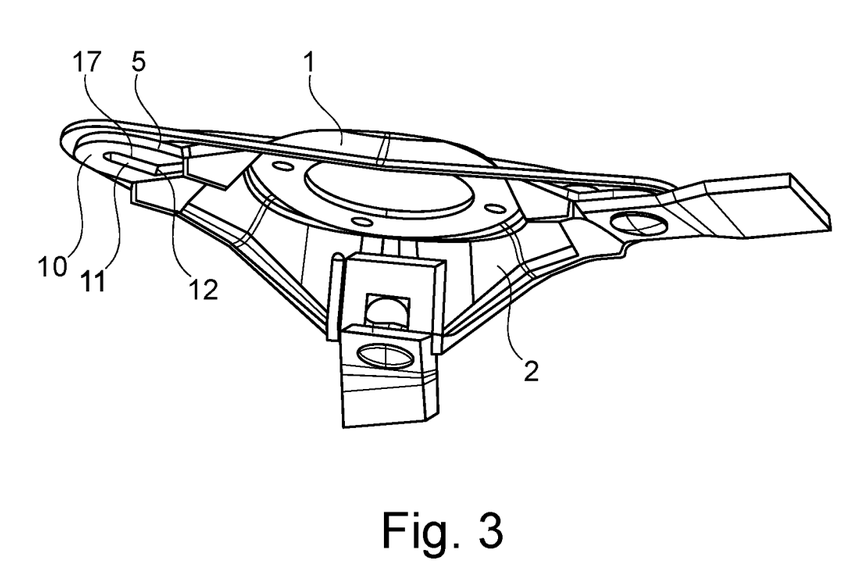
FIG. 3 shows a further schematic illustration of the assembly from FIG. 1 obliquely from below, wherein a cutting tool is removed.

FIG. 3 shows the assembly from FIG. 1 obliquely from below. It follows from FIG. 3 that a flat component 10 comprising an elongated hole 11 is arranged in the carrier section 5, in which the cutting tools 6 are mounted, on the underside of the carrier disk 2, which flat component 10 is open on its end 12, which is proximal to the axis of rotation of the carrier disk 2.

Figure 4:
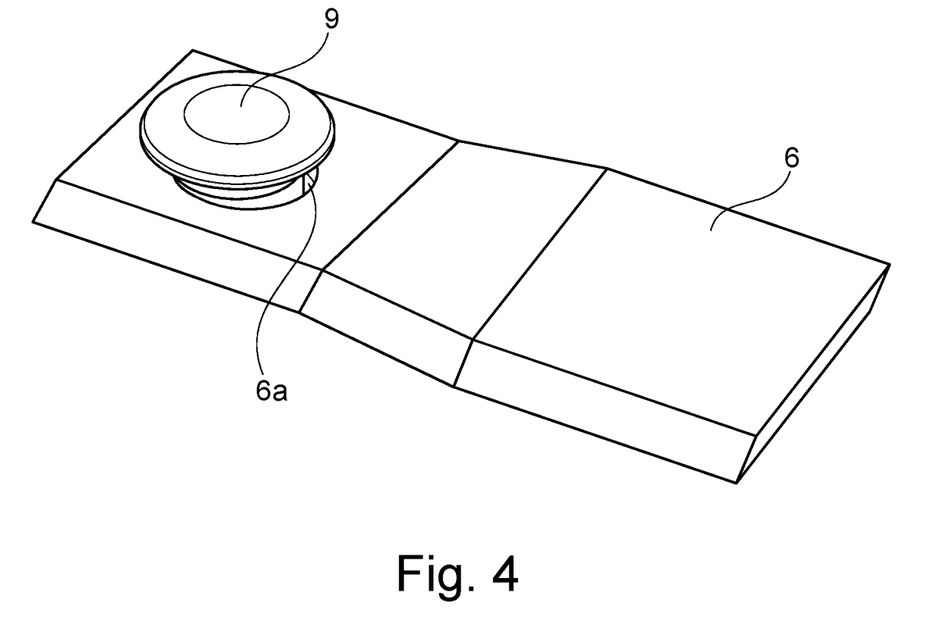
FIG. 4 shows a schematic perspective illustration of a cutting tool comprising a mounting bolt mounted thereto in a non-detachable manner.

FIG. 4 shows a schematic perspective illustration of the cutting tool 6 comprising the mounting bolt 9 mounted thereto. The mounting bolt 9 is mounted in an assigned opening 6a in a non-detachable manner.

Figure 5:
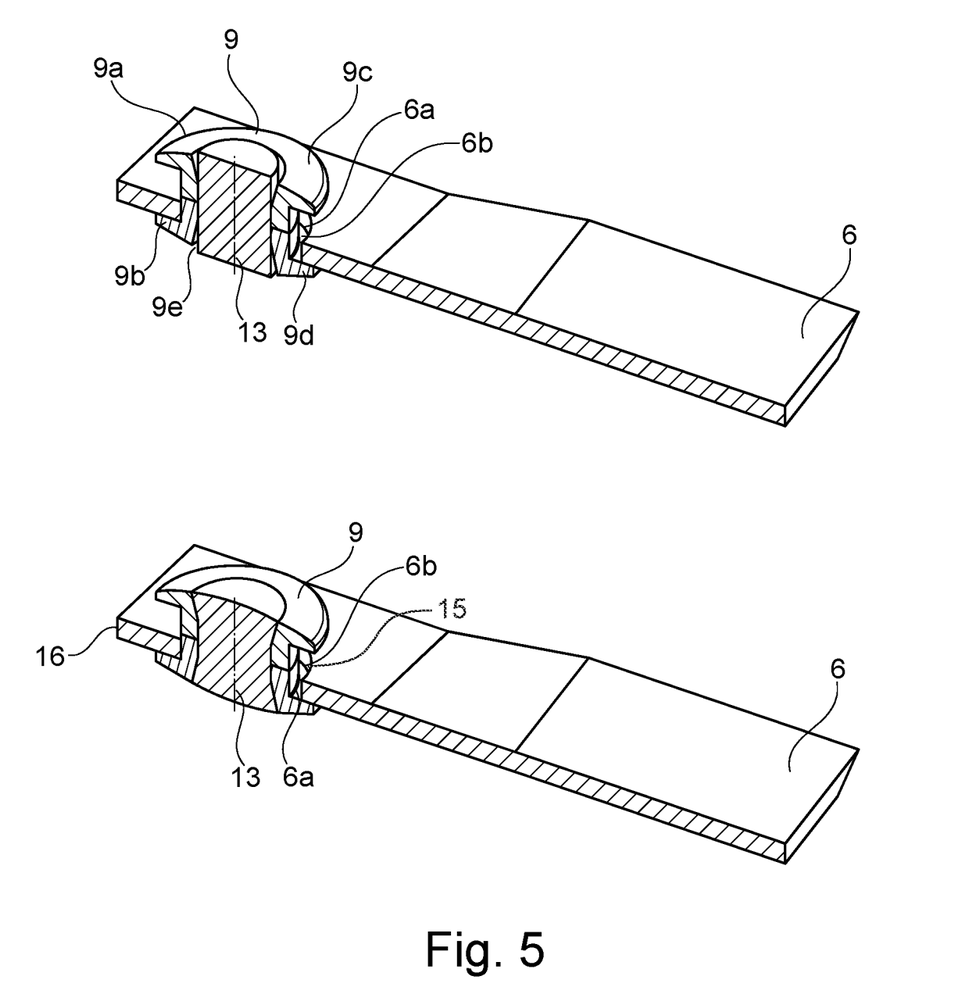
FIG. 5 shows a schematic perspective illustration of the assembly comprising a cutting tool and a mounting bolt in section during the mounting of the mounting bolt and after conclusion of the mounting.

FIG. 5 shows a schematic perspective illustration of the assembly comprising the cutting tool 6 and the mounting bolt 9 in section during the mounting of the mounting bolt 9 and after conclusion of the mounting (see the bottom illustration). The mounting bolt 9 is formed with an upper and a lower sleeve component 9a, 9b. The upper and the lower sleeve component 9a, 9b are located opposite one another in the region of the opening 6a, when the mounting bolt 9 is arranged essentially centrically in the opening 6a with respect to its longitudinal extension. On the upper and the lower sleeve component 9a, 9b, bolt top ends 9c, 9d are formed, the outer circumference of which is greater than an opening surface 6b of the opening 6a, so that the mounting bolt 9 is arranged in the opening 6a in a non-detachable manner after the mounting.

According to the illustration in FIG. 5, the opening surface 6b of the opening 6a is greater than the mounting bolt 9 in the middle region, so that the mounting bolt 9 is accommodated loosely in the opening 6a, for example can be tilted relative to its longitudinal axis.

An inner opening 9e of the upper and of the lower sleeve component 9a, 9b widens conically outwardly. A core pin or bolt 13 is introduced therein in a positive fitting manner (see bottom illustration in FIG. 5), in order to secure the mounting bolt 9 to the cutting tool 6 in a non-detachable manner.

Figure 6:
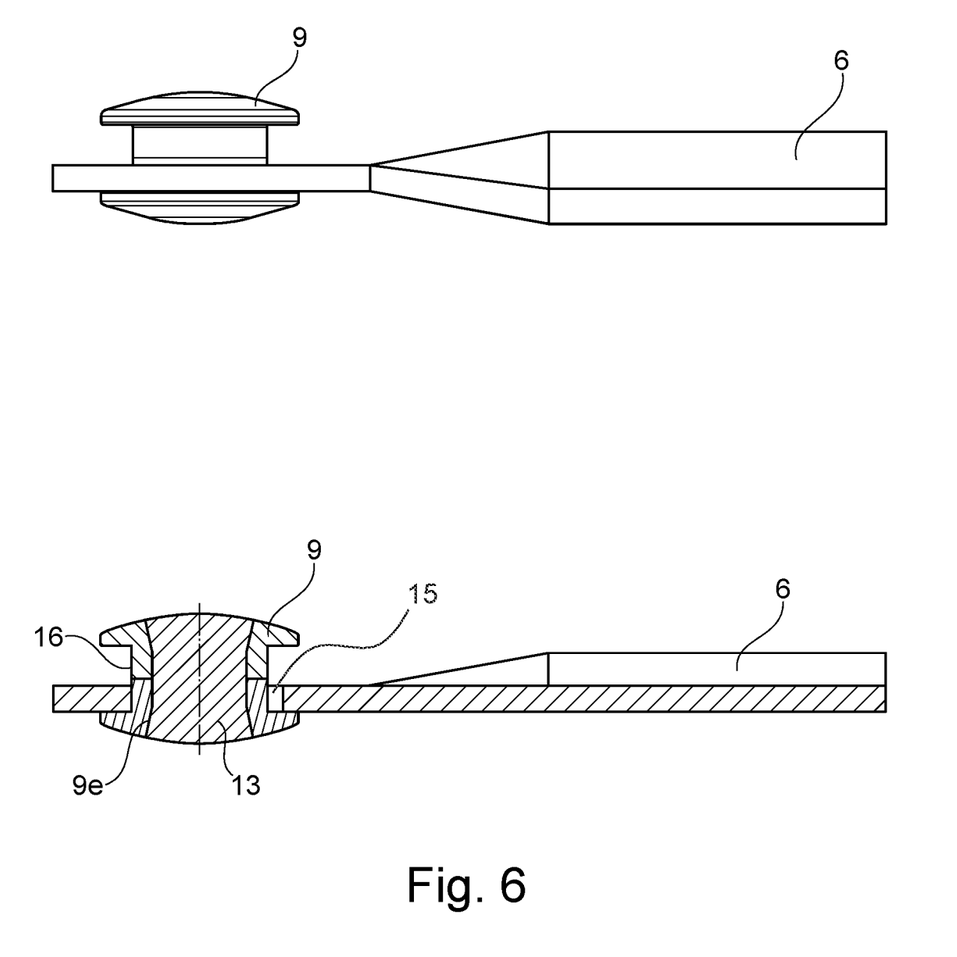
FIG. 6 shows a schematic perspective illustration of the assembly from FIG. 5 in section.

FIG. 6 shows the assemblies from FIG. 5 from the front and in section.

Figure 7:
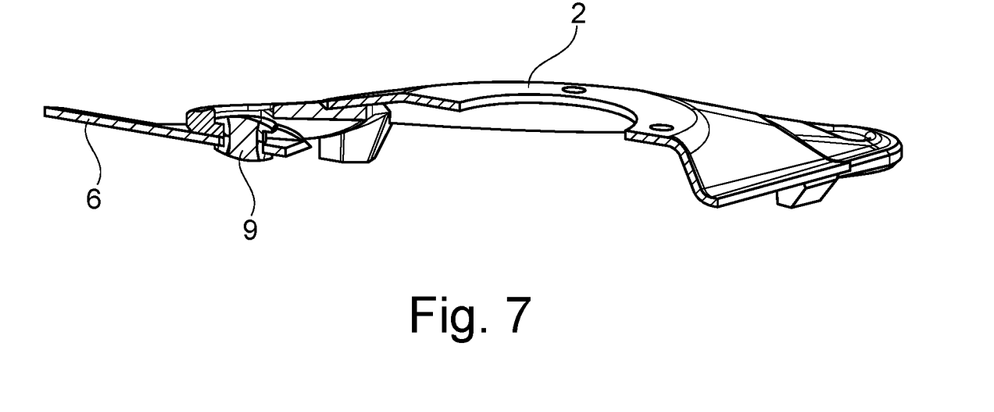
FIG. 7 shows a schematic illustration in section when the assembly comprising cutting tool and mounting bolt is mounted to a carrier disk.

FIG. 7 shows a schematic illustration in section, when the assembly comprising the cutting tool 6 and the mounting bolt 9 is mounted to the carrier disk 2.

Figure 8:
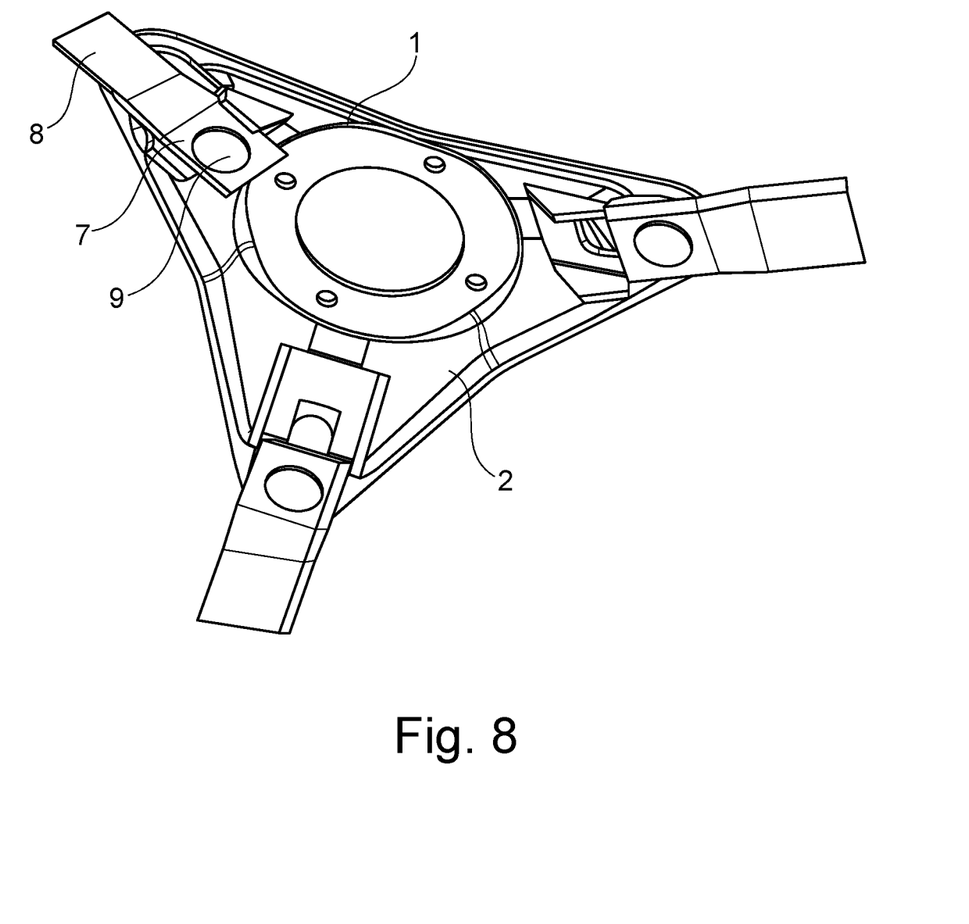
FIG. 8 shows a schematic illustration of the assembly from FIG. 1 obliquely from below, wherein a newly mounted cutting tool with mounting bolt (see cutting tool left top) is arranged in an assigned tool carrier section.
Figure 9:
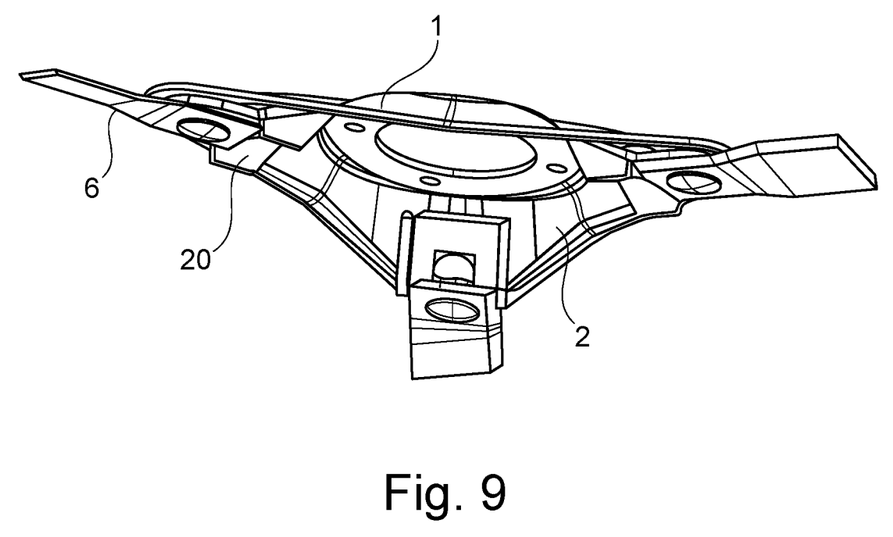
FIG. 9 shows a schematic illustration of the assembly according to FIG. 1 obliquely from below, wherein, in contrast to FIG. 8, the newly mounted cutting tool is displaced into the use position.

During the mounting of the cutting tool 6 with the help of the mounting bolt 9 from FIGS. 4 to 6 (see FIG. 8 in contrast to FIG. 3), a section, which is introduced into a bore 15 in the cutting tool 6, of the mounting bolt 9, which is provided with a constriction 16 (see FIGS. 5 and 6) is inserted via the open proximal end 14 into the elongated hole 11, so that lateral engagement sections 17 of the elongated hole 11 engage with the constriction 16. FIG. 9 thereby shows a position of the cutting tool 6, in which the mounting bolt 9 is barely still arranged in or in front of the open proximal end 14 of the elongated hole 11.

FIG. 9 then shows the newly mounted cutting tool 6 in the use position. Based on FIG. 8, the cutting tool 6 was thus moved along the elongated hole 11 radially outwardly with respect to the axis of rotation of the carrier disk 2, wherein the mounting bolt 9 is thereby guided along the elongated hole 11. It follows from FIG. 1 in this context that a bolt end 18 of the mounting bolt 9, which is thicker with regard to the constriction 16, is thereby guided in a further elongated hole 19 on the top side of the carrier disk 2.

As follows in particular from FIGS. 8 and 9, projections 20 are formed, which are parallel to the side edges of the elongated hole 11 and which secure the cutting tool against unintentional ejection during operation. The holding section 7 of the cutting tool 6 is furthermore guided between the projections 20 during mounting/removal.

Figure 10:
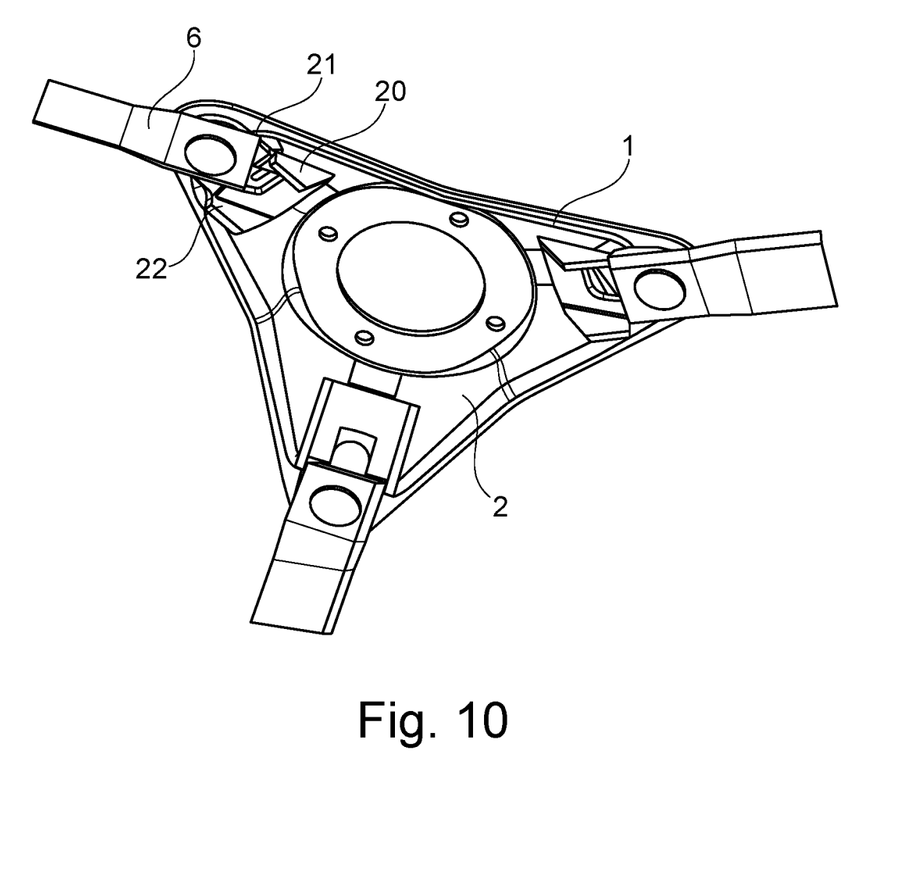
FIG. 10 shows a schematic illustration of the assembly according to FIG. 1 obliquely from below, wherein the newly mounted cutting tool is rotated out of the use position.

FIG. 10 shows a further schematic illustration of the arrangement according to FIG. 1 obliquely from below, wherein the newly mounted cutting tool 6 was turned out of the use position directed radially outwardly (see cutting tool left top in FIGS. 5 and 6) during mowing chopping, which can be caused in particular because the cutting tool 6 strikes an obstacle. A retention force had to be overcome for this purpose, which follows from the interaction of corners 21 of the projections 20, which corners 21 are distal to the axis of rotation of the carrier disk 2, and corner sections 22 of the holding section 7, which corner section 22 are proximal to the axis of rotation. It can alternatively be provided that such a retention or inhibition mechanism is not present, which can in particular be attained in that the distal corners 21 of the projections 20 and the proximal corners 22 of the holding section 7 of the cutting tools 6 are spaced apart when the cutting tool 6 is in the use position located radially outwardly with respect to the axis of rotation.

Figure 11:
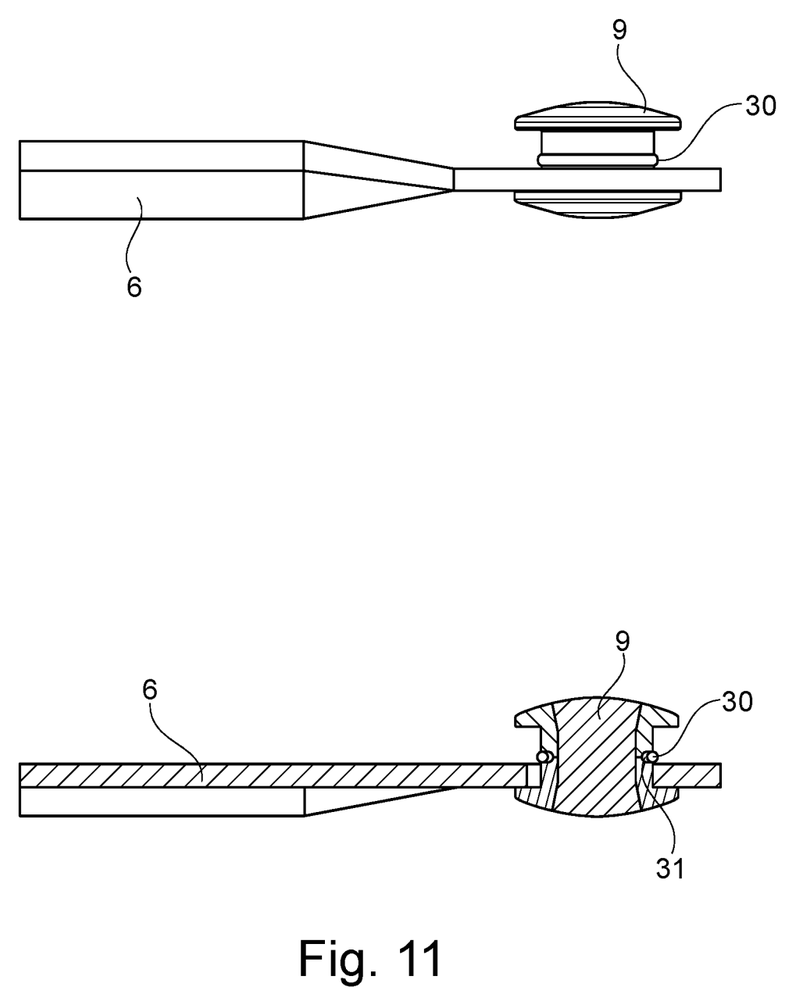
FIG. 11 shows schematic illustrations of a further embodiment of a cutting tool comprising a mounting bolt mounted thereto in a non-detachable manner from the front and in section, wherein a ring is arranged in the region of the constriction of the mounting bolt.

FIG. 11 shows schematic illustrations of a further embodiment of the cutting tool 6 with a mounting bolt 9 mounted thereto in a non-detachable manner from the front and in section, wherein a ring 30 is arranged in the region of the constriction 16 of the mounting bolt 9, which is embodied, for example, as a retaining ring. The ring 30 holds or secures the mounting bolt 9 in a direction transverse to the longitudinal direction of the cutting tool 6 in its relative position with respect to the cutting tool 6, for example in an asymmetrical position with respect to the opening 6a. A movement of the mounting bolt 9 in the direction transverse to the longitudinal direction of the cutting tool 6 can thereby be made possible within limits.

The ring 30 can be mounted to the mounting bolt 9 in a detachable or non-detachable manner. In the case of the shown example, the ring 30 is partially accommodated in an assigned groove 31, which extends circumferentially on the mounting bolt 9.

The features disclosed in the above description, the claims, and the drawing can be of importance for the realization of the different embodiments, both individually and in any combination.

What is claimed is:

1. An assembly for a mower of a mowing or chopping machine, comprising:
   a tool carrier which is formed with a carrier disk and which is configured to be mounted rotatably about an axis of rotation to a mower of a mowing or chopping machine; and
   cutting tools, which are each formed with a cutting blade located radially outwardly with respect to the axis of rotation and a holding section located radially inwardly with respect to the axis of rotation and which are detachably mounted to the carrier disk in an assigned carrier section, wherein the cutting tools are each mounted to the tool carrier by a mounting bolt, which is in each case mounted to the cutting tools in a non-detachable manner,
   wherein in an unmounted position of the cutting tool, the mounting bolt is arranged in an assigned opening of the cutting tool in a non-detachable manner and displaceably relative to the cutting tool in a direction transverse to the vertical axis of the mounting bolt and rotationally around a line aligned with the vertical axis of the mounting bolt,
   wherein the mounting bolt comprises opposite ends between which a constriction is arranged, each of the ends having a top surface which is larger than the assigned opening through which the mounting bolt is arranged,
   wherein in the assigned carrier sections, an elongated hole is formed, which runs radially to the axis of rotation and into which, for mounting the cutting tool, the mounting bolt is inserted in a region proximal to the axis of rotation, and
   wherein the elongated hole has, at least in a region distal to the axis of rotation, engagement sections, which are formed along an elongated hole edge and which engage with the constriction on the mounting bolt when the mounting bolt, which is accommodated in the holding section of the cutting tool, is displaced from the proximal region of the elongated hole into the region of the elongated hole with the engagement sections during the mounting of the cutting tools.

2. The assembly according to claim 1, wherein in the unmounted position of the cutting tool, the mounting bolt is arranged in the assigned opening of the cutting tool so as to be capable of being tilted relative to the cutting tool surface.

3. The assembly according to claim 1, wherein the mounting bolt has a multi-part design.

4. The assembly according to claim 3, wherein at the mounting bolt, sleeve components are connected to one another in a non-detachable manner by means of a core pin.

5. The assembly according to claim 1, wherein projections located opposite one another and extending in the longitudinal direction of the elongated hole are formed in the assigned carrier sections, which projections delimit or essentially completely prevent a rotation of the cutting tool about the mounting bolt at least when the mounting bolt accommodated in the holding section of the cutting tool is arranged in a radially inner elongated hole half.

6. The assembly according to claim 5, wherein the elongated hole is formed on a tool carrier underside.

7. The assembly according to claim 6, wherein, on a tool carrier top side, a further elongated hole is formed, which overlaps with the elongated hole at least in sections and leadingly accommodates a bolt end of the mounting bolt.

8. The assembly according to claim 1, wherein the cutting tools are mounted to the tool carrier in a self-aligning manner in the mowing or cutting operation.

9. The assembly according to claim 1, wherein the cutting tools are mounted to the tool carrier in a self-securing manner in the use position in the mowing or cutting operation.

10. A replacement cutting tool for an assembly according to claim 1, wherein a mounting bolt is mounted to the replacement cutting tool in a non-detachable manner.

11. A mower for a mowing or chopping machine, comprising a drive mechanism, which provides a rotating drive movement, and an assembly according to claim 1, which couples to the drive mechanism.

\* \* \* \* \*